June 19, 1962 W. E. GREENE 3,039,508
WEDGE LOCKED INSERT
Filed Nov. 18, 1957
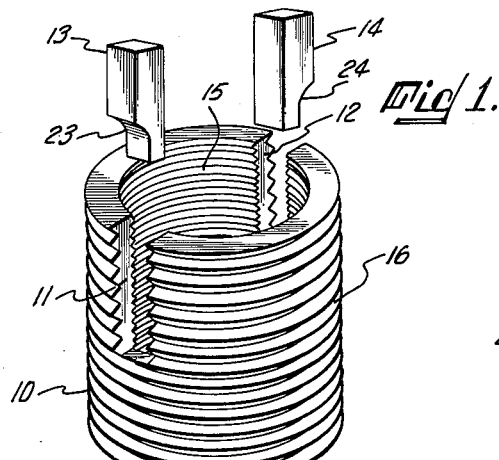
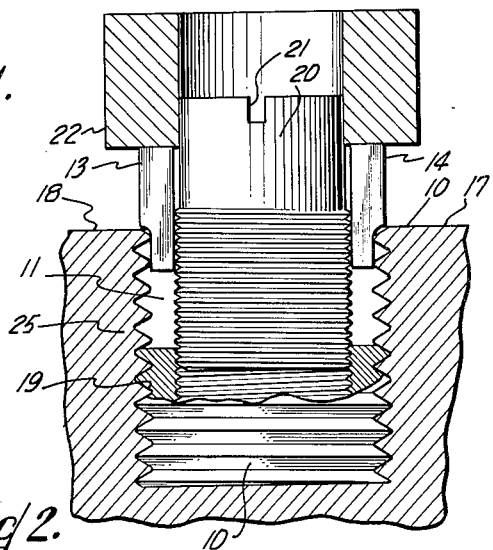
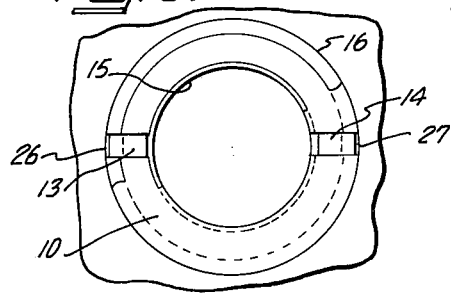
INVENTOR.
WHITNEY E. GREENE
BY Beehler & Shanahan
Edmond F. Shanahan
ATTORNEYS.

3,039,508
WEDGE LOCKED INSERT
Whitney E. Greene, 712 S. Wilton Place,
Los Angeles 5, Calif.
Filed Nov. 18, 1957, Ser. No. 697,014
1 Claim. (Cl. 151—23)

This invention relates generally to inserts which are made in the form of a cylinder with internal and external threads, and which are inserted in holes in machine parts made of aluminum, magnesium, plastic, or other relatively soft material to provide strong threaded connection for steel bolts or screws. More particularly, the invention relates to an insert, which is split by at least one longitudinal slot extending all or a part of the length of the cylinder, and in which locking is achieved by driving a wedge into said slot.

The relatively fine threads of standard thread bolts and machine screws are well designed to make strong threaded connection in steel nuts or internally threaded bores in steel parts made from forgings, tool steel, or hard castings. However, threads of such fineness easily shear out of relatively soft material, such as molded plastic, cast magnesium, cast aluminum, and even soft cast iron. It is, therefore, standard engineering practice to line bore holes in soft material with threaded inserts, which provide a reinforced means of threaded connection. The insert is ordinarily made of steel having a tensile and shear strength corresponding to the strength of the bolt, screw, or threaded stud which is to be threadably connected. The exterior surface of the insert cylinder is provided with gripping projections much larger than the internal threads. A common form of such projections preferred in the present invention, is a relatively massive external thread adapted to mate with correspondingly large internal threads in a bore in the insert-receiving part.

Inserts tend to loosen, and either rotate or retract from the receiving bore, unless locked in place by one or more associated locking parts. In the past, the insert cylinders and the locking parts have been supplied disassembled from each other, and the locking part has been placed in locking position only after the insert had been driven or threaded into the receiving bore. The locking parts are usually small, and are difficult to place in position, and easy to lose. Previously known locking means have merely served to prevent the insert from rotating or from retracting from the bore hole, or both. However, they have not necessarily prevented the insert from being relatively loose in position, nor have they always given a fluid-tight sealing contact entirely around the periphery of the insert.

The placement of previously known inserts and locking parts has required some skill and has presented some difficulties in handling the smaller sizes. Once the insert is almost entirely received in the bore, it is difficult to grip it satisfactorily, either with the fingers or with a tool.

It is a major object of the present invention to provide an insert assembly which is supplied with the insert cylinder and its associated locking parts already assembled into a single unitary combination. The locking parts are tightly held in assembly with the insert cylinder and need only be driven to locking position by means of a special tool after the insert combination has been hand threaded or otherwise placed in the bore of the receiving part.

It is another important object of the invention to provide a locking means which produces a very tight engagement between the external surface of the insert cylinder and the bore of the receiving part around substantially the entire periphery. This adds strength and a pressure seal.

Another object is to provide an insert assembly from which the locking parts project so as to serve as handles during the process of insertion, being driven into place only after insertion is completed. Screwdrive slots may be added, if desired, in any position.

In the present invention, the wall of the insert cylinder is longitudinally split, for at least part of the length of the cylinder, to accommodate a locking wedge disposed parallel to the axis of the insert cylinder. It will be obvious that the insert cylinder may be split in one or more places to provide for one or more corresponding locking wedges. Also, it will be obvious that the insert cylinder may be split for its entire length if only one split is used; also it will be obvious that where the insert cylinder is split in two or more places the splits must extend only part of the length of the cylinder in order to prevent it from being separated into two or more parts. One preferred method of partially splitting the insert cylinder is to cut two diametrically opposite slots by one transverse slotting operation.

The principles and advantages of the invention will be understood from the following description of two specific embodiments, taken in connection with the accompanying drawings, in which:

FIGURE 1 is an exploded perspective view of one form of the invention employing a pair of hard steel wedges;

FIGURE 2 is a sectional view taken at a plane normal to the surface of the insert-receiving body, the insert itself being shown partly in section to reveal the disposition of the placement tool;

FIGURES 3 and 4 are views showing the insert of FIGURES 1 and 2 after full installation, FIGURE 3 being a plan view of the bore hole, and FIGURE 4 being a fragmentary transverse sectional view;

FIGURE 5 illustrates another type of wedge which may be used, the sharply angled wedge shape being suited to wedges of soft material, such as nylon or similar plastics, copper, aluminum, etc.;

FIGURE 6 is a sectional view transverse to the bore hole in the insert-receiving part, and shows an insert with a pair of wedges like that illustrated in FIGURE 5, and an insert tool in position for driving said wedges into locking position; and FIGURE 7 is a transverse sectional view like FIGURE 6 showing the wedges after they have been driven into locking position.

FIGURE 8 is a perspective view of an insert cylinder which is split for its entire length to receive a wedge of relatively soft material.

In FIGURE 1, an insert cylinder 10 is divided for about half its length by a pair of oppositely disposed slots 11 and 12. A pair of wedges 13 and 14 are shown disassembled from the insert cylinder 10, being pictured above slots 11 and 12, respectively, into which they are insertable for assembly.

It will be noted that the walls of the slots 11 and 12 are substantially vertical, i.e., are in planes parallel to the axis of the cylindrical insert 10. Also, the wedges 13 and 14 may have slightly convex opposite faces, but in the embodiment illustrated in FIGURES 1 to 4, this was not necessary.

The interior of the insert cylinder 10 is threaded with standard bolt or machine screw threads 15. The exterior has a standard but larger thread 16.

FIGURE 2 shows the insert cylinder 10 threaded into an insert-receiving part, which is shown only fragmentarily. The insert 10 has been threaded into the soft material of part 17 until its upper end is flush with the outer surface 18 of the part 17, thus providing a reinforcing wall for the bore 19. The wedges 13 and 14 are shown partially inserted in the slots 11 and 12. This is the position they occupy from the time they are assembled at the point of insert manufacture until they are driven all the way into locking position, as will be described hereinafter. Thus, the portions of the wedges 13 and 14 which project above the surface 18 service as a convenient means for rotating the insert into position. Also, there is no problem of the wedges 13 and 14 being lost between the time of manufacture and the time of use, since they are so tightly and snugly received in the slots 11 and 12 that they remain as a unitary assembly unless subjected to severe lateral blows.

After the insert cylinder 10 has been placed in the position shown in FIGURE 2, a wedge-driving tool is employed for driving the wedges 13 and 14 into locking position. The wedge-driving tool is comprised of two parts, a threaded stud 20, which is transversely slotted at 21 at its upper end to provide engagement for a screwdriver, and a driving ring 22 loosely but closely received on the threaded stud 20.

The stud 20 is threaded into the insert cylinder 10 to sufficient depth to cover the inner openings of the slots 11 and 12. The ring 22 is then placed in the position shown in FIGURE 2, and tapped with a hammer from above, driving the wedges 13 and 14 all the way into the slots 11 and 12. The driving ring 22 and the threaded stud 20 are then removed. The fully installed insert is seen in FIGURES 3 and 4. It will be noted that the lower ends of the wedges 13 and 14 are substantially reduced in thickness in a radial direction, as indicated at 23 and 24 in FIGURE 1, in order to permit the initial insertion of the insert assembly as shown in FIGURE 2. However, the upper part of the wedges 13 and 14 have a thickness in the radial direction relative to the insert cylinder 10 extending to the bottom of the coarse threads 25 in bore 19. Thus, when the wedges 13 and 14 are driven downwardly into the locking position revealed in the sectional view of FIGURE 4, the upper part of the wedges 13 and 14 cut out a slotted path, indicated by the numerals 26 and 27, and revealed in end view in FIGURE 3. The wedges 13 and 14 are not only tightly gripped by the walls of the slots 11 and 12, when driven into the locking position, but are keyed into the slots 26 and 27, which they have formed in the process of being driven into position. The threaded stud tool 20 has served to prevent the wedges 13 and 14 from being displaced inwardly into the interior of the insert cylinder 10 when they are driven into locking position.

It will be seen from the foregoing description that, in the embodiment illustrated in FIGURES 1 to 4, it is necessary that the wedges be of a material sufficiently hard to shear a groove or slot in the coarse threads 25 in the bore 19 of the relatively soft material of which the insert-receiving part 17 is constructed. Also, the threaded stud tool 20 should be of a hard material, so that its threads are not damaged by the driving operation. Stainless steel is a preferred material for the wedges 13 and 14, and hardened tool steel is a preferred material for the threaded tool 20.

The wedges 13 and 14 are retained permanently in position in the slots 11 and 12 of the insert cylinder 10, as shown in FIGURE 4, by virtue of being tightly wedged therein. However, these wedges are easily removed, if desired. In addition, if desired, the slots 11 and 12 may extend to sufficient depth to permit a slight spreading of the split portion of the insert cylinder. The depth of the slots, and the width of the wedge and slot necessary to accomplish the spreading of the insert cylinder will be determined by the thickness of the cylinder wall and the modulus of elasticity of the material of which the cylinder is comprised. Also, it must be kept in mind that the spreading must not be so great as to interfere with ready threading of a bolt into the interior threads 15 of the cylinder 10.

A second embodiment of the invention, illustrated in FIGURES 5 to 7, may be referred to as the "soft material wedge design" as contrasted with the first embodiment, illustrated in FIGURES 1 to 4, which was better suited to wedges of hard material. Such plastics as nylon or Teflon, such metals as aluminum, copper, or the like, and fiber-glass or similar material is suitable as the soft material employed for the wedge. The principal requirement is that the wedge be of a material sufficiently soft to be cut by the threads of the bolt or machine screw which is to be threaded into the insert.

Preferably, the wedge used of the soft material is substantially of different shape from the wedges 13 and 14 in FIGURE 1. As seen in FIGURE 5, the wedge 30 is sharply convex, having a narrow entering end 31 and a thick driving end 32. Also, the wedge 30 is reduced in radial depth from the inner side and at the driving end, as indicated at 33, which is quite different from the wedges 13 and 14, as will be explained hereinafter.

FIGURE 6 shows a pair of wedges 30 and 34 partially inserted in the oppositely disposed slots 35 and 36 in an insert cylinder 37. The insert cylinder 37 is exactly the same in appearance as the insert cylinder 10 and slots 35 and 36 do not differ in any respect from slots 11 and 12, except that, in the usual case, they will extend more nearly the entire length of the insert cylinder 37 than would be the case in the usual hard material wedge design.

At the time of manufacture of the insert comprised of the cylinder 37 and the wedges 30 and 34, the two wedges are partially inserted, as shown in FIGURE 6, so that at the time of assembly, the assembler deals only with the unitary assembly and need not insert the wedges at the point of use.

A single driving tool 38, comprised of an unthreaded arbor 39 closely received in the internal thread 40 of the cylinder 37 and a driving head 41, of enlarged diameter for engaging the upper or driving ends of the wedges 30 and 34, is employed. The tool 38 is inserted as shown in FIGURE 6, and pressure is applied to the driving head 41, moving it toward the bore of the cylinder 37, simultaneously forcing the wedges 30 and 34 into locking position, as seen in FIGURE 7.

It will be noted that the inner surfaces 43 and 44 of the wedges 30 and 34, respectively, project inwardly into the thread grooves of the internal thread 40, whereas, in the hard material wedge design of FIGURES 1 to 4, a threaded tool 20 was used to prevent such interference. Also, it will be noted that the reduced portion 33 at the driving end 32 of the wedge 30, and similarly in the case of wedge 34, leaves the threads 40 free for the introduction of a bolt at the entering end. However, as the bolt is threaded into the bore 42, its threads finally engage the soft material wedges 30 and 34 and must cut into them as it advances. After the bolt or other threaded fastener has been tightened into place within the threaded insert 37, the soft material of wedges 30 and 34 offers frictional resistance to any loosening or unthreading of the bolt.

The principal locking effect of driving the wedges 30 and 34 into slots 35 and 36 results from the slight spreading of the partially divided insert cylinder 37, which is forced into tight contact with the adjacent walls of the insert-receiving part 45 around the entire outer periphery of the insert cylinder 37. In addition, the soft material of the wedges 30 and 34 may actually be deformed, as indicated at 46 and 47 in FIGURE 7, to partly enter the grooves 48 of the coarse threading in the insert-receiving part 45.

FIGURE 8 shows how the insert cylinder may be split by a slot 35a for its entire length to receive a single wedge 30 of relatively soft material. The single wedge 30 may be pre-located, i.e., may be completely inserted into the slot 35a to be gripped and retained by the insert cylinder prior to installation of the insert cylinder as shown in FIGURE 8. The insert cylinder 37 in FIGURE 8 has a pair of diametrically opposite screw driver slots 36a and 36b.

When the insert 37 of FIGURE 8 is screwed into the threaded bore of a body, the split insert cylinder closes slightly, thereby compressing and partially deforming the soft material of the wedge 30. Here again, the soft material of the wedge presses against the surrounding coarser threads of the body in which the insert cylinder is mounted, the wedge being slightly deformed by the surrounding threads. The wedge 30 also extends into the region of the inner screw thread of the insert cylinder and, therefore, resists the introduction of the bolt or threaded fastening means and consequently is deformed by the threads of the bolt or fastening means. Thus when the insert cylinder 37 of FIGURE 8 is completely installed and a bolt is screwed into the insert, the soft material of the deformed wedge 30 both locks the insert cylinder against rotation in the surrounding body and locks the bolt against rotation in the insert cylinder.

It will be understood that the foregoing two specific embodiments are illustrated and described for purposes of disclosure of the invention, and not for limiting its scope. It will be obvious that those skilled in the art can alter it by various changes without departing from the spirit and scope of the appended claim.

An insert for installation in a threaded bore in a body to receive a threaded fastening member, comprising: an internally and externally threaded insert cylinder to screw into said bore, said insert cylinder being split longitudinally by a full length slot; and a locking body of relatively soft material positioned completely in said slot and fitting tightly therein, said locking body being a longitudinally tapered wedge shaped body, said body engaging the slot walls to expand the insert cylinder prior to installation of the insert cylinder, said expanded insert cylinder having a major external thread diameter larger than the major thread diameter of said bore whereby said insert will be contracted when screwed into said bore thereby deforming said locking body whereby it extends into the region of the external screw thread of the insert cylinder to lock the installed insert cylinder against rotation in said bore, said locking body extending radially inwardly substantially beyond the root diameter of the internal screw thread of the insert cylinder to lock said fastening member against rotation relative to the insert cylinder.

References Cited in the file of this patent
UNITED STATES PATENTS

| | | |
|---|---|---|
| 947,327 | Funk | Jan. 25, 1910 |
| 1,080,332 | Dodds | Dec. 2, 1913 |
| 2,318,415 | Patzschke et al. | May 4, 1943 |
| 2,407,160 | Kahn | Sept. 3, 1946 |
| 2,544,096 | Laughlin | Mar. 6, 1951 |
| 2,568,640 | Kindelberger | Sept. 18, 1951 |
| 2,640,521 | Zavoico | June 2, 1953 |
| 2,783,811 | Cummaro | Mar. 5, 1957 |
| 2,936,014 | Kraus et al. | May 10, 1960 |